Oct. 30, 1934.  V. E. SHOWALTER ET AL  1,978,605
TACHOMETER
Filed Aug. 10, 1931  5 Sheets-Sheet 1

Inventors:
Victor E. Showalter
Clarence H. Guptail
By Wilkinson, Huxley, Byron & Knight
attys.

Oct. 30, 1934.                V. E. SHOWALTER ET AL                1,978,605
                                  TACHOMETER
                    Filed Aug. 10, 1931        5 Sheets-Sheet 2
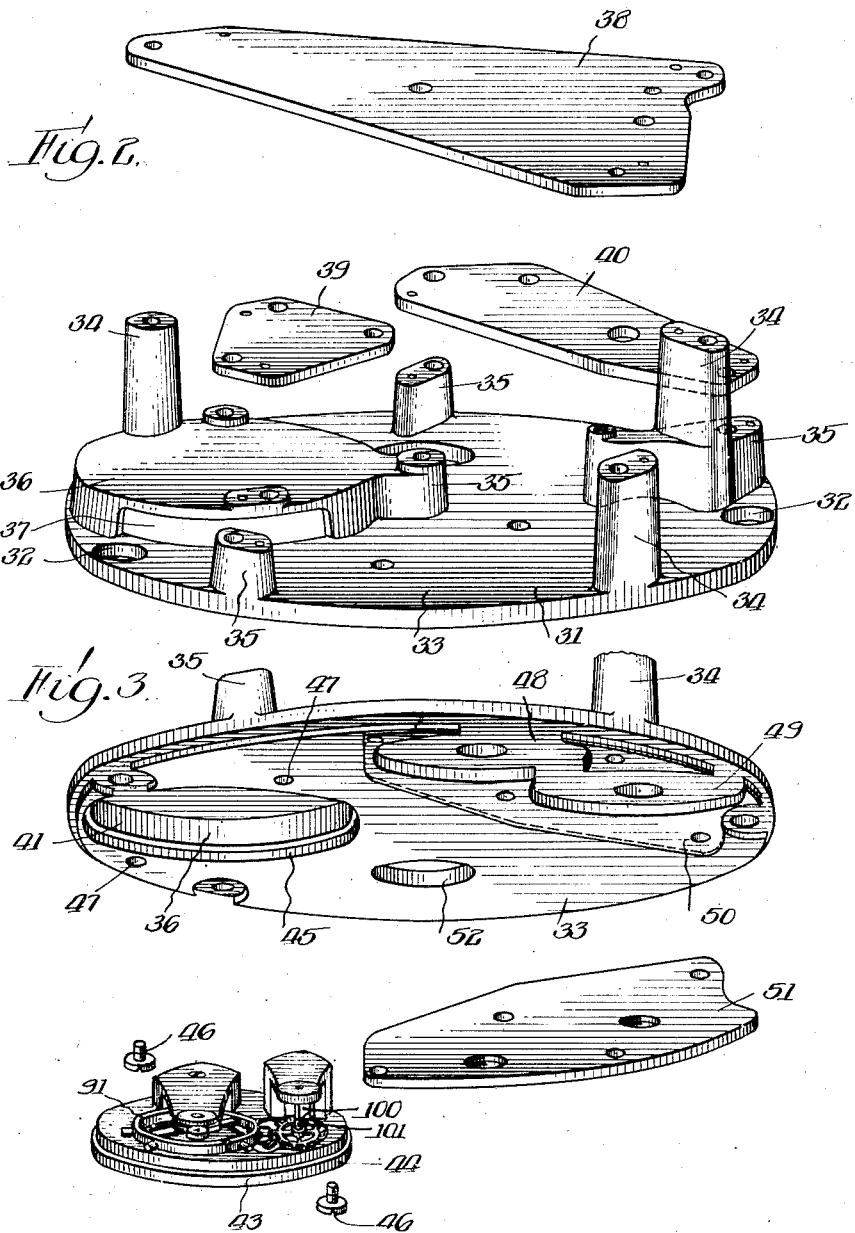
Inventors:
Victor E. Showalter,
Clarence H. Guptail,
By Wilkinson, Huxley, Byron & Knight
                                    Attys.

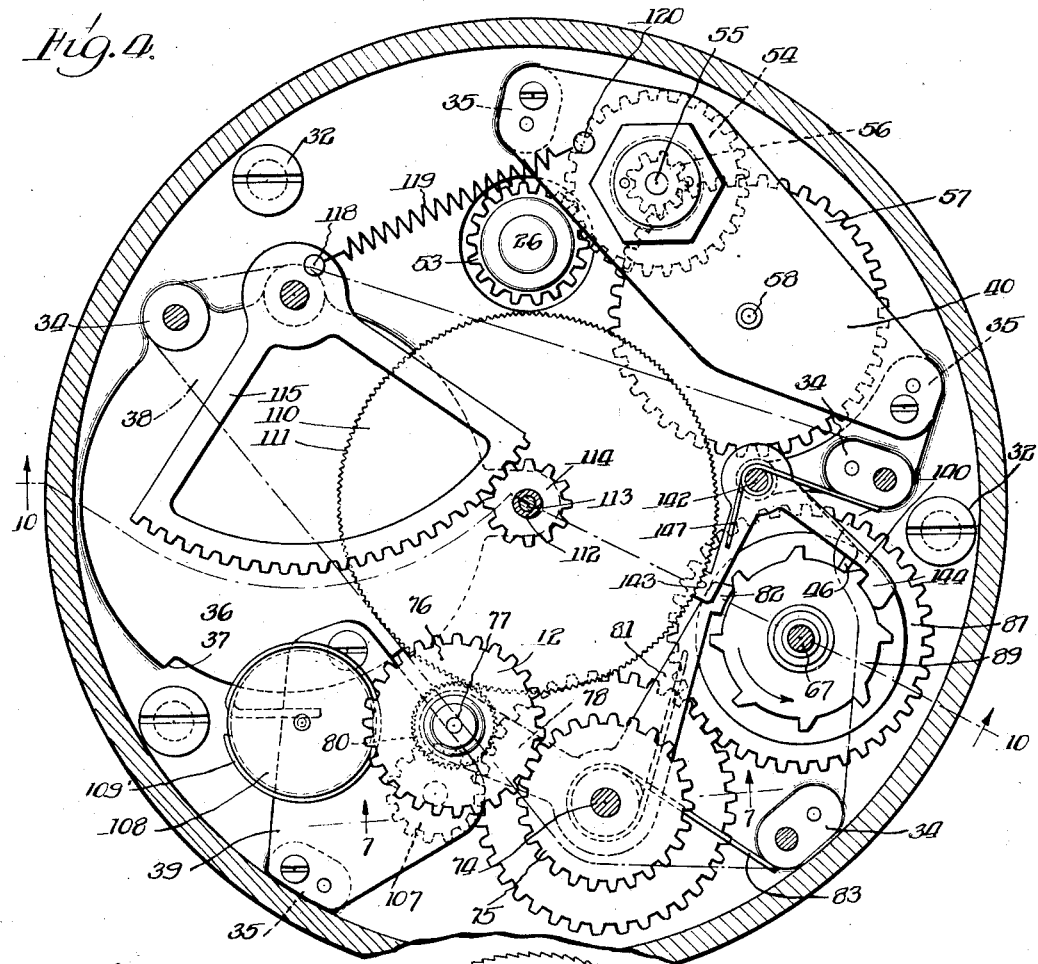

Oct. 30, 1934.    V. E. SHOWALTER ET AL    1,978,605
TACHOMETER
Filed Aug. 10, 1931    5 Sheets-Sheet 4

Inventors:
Victor E. Showalter
Clarence H. Gupta
By Wilkinson, Huxley, Byron & Knight
Attys Oct. 30, 1934.  V. E. SHOWALTER ET AL  1,978,605

TACHOMETER

Filed Aug. 10, 1931  5 Sheets-Sheet 5

Inventors:
Victor E. Showalter
Clarence H. Guptail,
By Wilkinson, Huxley, Byron & Knight
attys.

Patented Oct. 30, 1934

1,978,605

UNITED STATES PATENT OFFICE 1,978,605

TACHOMETER

Victor E. Showalter and Clarence H. Guptail, Elgin, Ill., assignors to Elgin National Watch Company, Elgin, Ill., a corporation of Illinois Application August 10, 1931, Serial No. 556,152

20 Claims. (Cl. 235—104)

This invention relates to improvements in chronometric tachometers for indicating the speed of rotation of any rotating object and particularly adapted for use on aeroplanes for indicating the R. P. M. of the engine shaft.

The tachometer of this invention is constructed for operation upon the principles embodied in the tachometer disclosed in the patent to Prouty, No. 1,447,426 issued March 6, 1923 but embodies certain differences in construction, arrangement and operation hereinafter more fully set forth rendering the tachometer of this invention a novel and marked improvement thereover.

Tachometers of the type hereinafter disclosed for illustrating the present invention operate upon the principle of advancing an indicating hand at a rate directly proportional to the R. P. M. of the shaft being measured, over a limited period of time such as, for instance, one second, and thereafter disconnecting the drive for a like period of one second while maintaining the indicating hand in its advanced indicating position. During the disconnected period, various parts of the mechanism are restored to their starting positions after which the connection is again effected. The second connection causes the mechanism to again advance an amount directly proportional to the speed of rotation of the measured shaft for a like period of one second and at the expiration thereof the indicating hand is caused to be located in a position indicative of the speed of rotation during this next period of one second. This operation is continuously repeated as long as the tachometer is in operation so that the final result is an indication determined by a succession of pointer positions, each position of which is indicative of the average speed for one second, for alternate seconds of operation.

In order to assist in the understanding of the objects of this invention, a brief description will now be given of the fundamental parts of the mechanism together with their functions, both individually and with relation to each other.

The first part comprises what is herein termed the "driving mechanism" which comprises a main gear train connected at one end for receiving rotation from the shaft, engine, or other object, the speed of rotation of which is to be indicated and having at its opposite end, a gear which will be herein termed the "counter driving gear". The gears of this train are always maintained in driving contact so that the counter driving gear is caused to rotate whenever the measured shaft is rotated and at a speed directly proportional thereto. This gear train includes a reversing mechanism whereby the counter driving gear is always rotated in the same direction for either direction of rotation of the measured shaft.

This gear train has two main functions which are: First, to impart a rotation to the counter mechanism in a particular manner hereinafter more fully described, directly proportional to the speed of rotation of the measured shaft and further, to serve as a source of rotary power for storing energy in a portion of the mechanism hereinafter referred to and described as the "power plant". In the tachometer of the present disclosure, this gear train is effective to reduce the speed of rotation to a considerable degree below the speed of the measured shaft so for a better understanding of references hereinafter made, it may be understood that this gear train is divided structurally into two parts; one part of which is at the high speed end of the train and hereinafter designated the "high speed gears" and the remaining lower speed part which serves to carry out the operations above referred to.

The second part of this tachometer is what is herein termed the "power plant" which comprises a spring having one end in winding connection with a shaft of the aforementioned gear train and its other end in frictional sliding driving contact with a gear element, the movement of which is confined to a definite rate of rotation through connection with a suitable escapement mechanism hereinafter more fully described. The power plant is stored with energy by the winding rotation of the spring from the gear train and the energy so stored, serves as a source of power for rotating a controlling cam, and also for operating the escapement mechanism.

The cam above referred to which is here described as a part of the power plant is highly important in the operation of the tachometer and at this point, it will be helpful to know that the rotary movement of the cam is imparted by the power plant and controlled by the escapement mechanism, the latter of which also receives its driving power from the power plant.

The third important part is the "escapement and escapement connecting mechanism" which comprises a suitable escapement movement, including a balance wheel and escapement and connecting mechanism therefor including what is herein termed a "fly". The fly comprises a pair of radially extending arms, 180° apart, positioned on a rotary shaft mounted in a manner similar to an ordinary gear in the connecting gear train between the escapement mechanism and the power plant.

In effect, the fly is a two-toothed gear in the connecting gear train, provided for the purpose of converting the unwinding action of the spring of the power plant from a substantially continuous movement, as it would be if an ordinary gear were used, into an intermittent movement.

It is clear that the fly in the connecting gear train permits the power plant to run freely under the action of the spring throughout that degree of movement permitted by approximately 180° rotation of the fly and that it is there caught by the contact of one arm of the fly in mesh with the escapement mechanism and that the further movement of the fly throughout a small degree is controlled by the escapement mechanism until the fly is released to run freely through another 180° and so on, during the continuation of the operation.

The result of this action is a quick start and stop movement imparted to the cam above referred to, the periods of which are definitely controlled by the escapement mechanism for movement by definite time periods.

The fourth and last essential part of this tachometer is what is termed the "counter mechanism" which comprises a gear and a pointer disk mounted coaxially, and other instrumentalities whereby the pointer disk is caused to advance with the gear for advancing the pointer to successive positions indicative of the degree of advance of the gear for each alternate second of operation. The gear of the counter is driven by the counter driving gear above referred to, during a period of one second, each alternate second, and the connecting and disconnecting of this driving relation is effected by a lever controlled by the above mentioned cam.

In addition, locking levers are provided for the gear and disk of the counter mechanism together with separate spring means tending to restore the gear and the disk to zero positions.

One of the important features of this part of the mechanism is the construction, arrangement and operation of a timing lever and the gear and disk locking levers, all three of which are controlled by the single cam in a predetermined timed relationship in a manner to effect the proper operation of the indicating hand.

With the above understanding of the general construction and operation of this tachometer, it may be stated that it is an object of the present invention to provide a chronometric tachometer of the type above referred to, which embodies all or any one or more of the following structural provisions and advantages:

First, a frame for mounting the mechanism comprising a frame plate and supporting posts formed as an integral piece, preferably as a casting and also having a cavity therein for housing the escapement mechanism which may be provided as a complete independent unit inserted and held in said cavity and capable of being adjusted or replaced without affecting the other portions of the mechanism.

Second, the provision of an independent supporting frame plate for the fly and also if desired, the first intermediate gear of the connecting train between the escapement mechanism and the power plant, for the purpose of permitting the fly to be independently removed without disturbing the remaining portion of the mechanism for either replacement or more particularly the advantage of readily changing the meshing gear contact between the fly and the first intermediate gear one or more teeth for properly timing the mechanism.

In connection with timing, it will readily appear that it is essential to have the fly so connected in the gear train between the escapement mechanism and the power plant as to bring the train to rest when the cam is in the desired positions for controlling the movement of the timing and locking levers.

Third, the provision of an independent frame plate for mounting the high speed gears of the driving mechanism whereby these gears may be separately replaced independently of the other mechanism. This feature makes for improvement, as these gears require replacement more often due to wear effected by their high speed of operation.

Fourth, the provision of a spring locking pawl in contact with a gear of the main gear train positioned after the reversing mechanism which is effective to confine the rotation of the mechanism to one direction, and to thereby positively force the proper operation of the reversing gears.

Fifth, the location of the timing lever for pivotal movement on the timing lever shaft whereby the movement of the timing lever by the cam causes a movement of the counter driving gear in a concentric path around the timing lever shaft, resulting in the maintenance of a perfect gear contact for driving the counter driving gear.

Sixth, the mounting of an intermediate gear, connecting the escapement mechanism with the power plant, coaxially with the timing lever shaft which provides a compact and efficient construction in which the timing lever shaft is independent and to one side of the axis of the cam and in which no difficulty is encountered in establishing a connection between the escapement mechanism and the power plant.

Seventh, the utilization of a single cam for actuating the timing lever and the two locking levers, the variable timing operation of which is effected by selecting the centers of the respective levers, the length of the lever arms and the extent of the contacting faces of the levers on the face of the cam. Heretofore, it has been necessary to provide three independent cams for effecting the proper actuation of these respective levers.

Eighth, the utilization of the end of the timing lever when mounted coaxially with the timing lever shaft for establishing a zero stop for the counter gear and pointer disk.

Ninth, the provision of spring pulled gear segments in mesh with gears carried by the counter gear and the pointer disk respectively, for restoring these elements to their zero positions. The zero position of the disk is determined by the timing lever and the stop position of the disk is determined by abutments contacting the counter gear and disk respectively. These stops determine the rest positions of the spring pulled segments. This operation is a marked improvement over the establishment of the stop zero position by an element contacting the segments or equivalent mechanism, because in the latter instance, a slight movement is permitted between the teeth at the segment connection which produces slight inaccuracies in restoring the counter gear and counter disk to their zero positions.

Furthermore, the segments provided by this invention, establish a more uniform movement of the counter gear and pointer disk than a directly connected spring due to the more uniform tension provided and the slight friction and inertia offered by the segments interposed between the springs and the counter gear and pointer disk respectively.

Although it is an important object of this invention to provide the structural improvements and advantages in operation above referred to, various other objects not specifically enumerated, are contemplated for this invention as will readily appear to one skilled in the art as the following description proceeds.

The following description relates to a particular disclosure which is given for the purpose of illustrating the present invention and the invention should not be limited thereby, as the scope of the invention should be determined from an understanding of the present disclosure and an appreciation of the advantages which the invention produces therein.

Furthermore, the exact scope of the invention may be determined from the appended claims.

The following description will be more readily understood by referring to the accompanying drawings, in which—

Figure 2 is a perspective view of the frame with the top frame plates displaced to clearly disclose their construction and Figure 3 is a perspective view of the underneath side of the frame shown in Figure 1 with the escapement mechanism and lower cover plate displaced to clearly show their construction.

Figure 4 is a plan view of the completed mechanism taken on the line 4—4 of Figure 9 and looking in the direction of the arrows.

Figure 5 is a fragmentary view in plan taken on the line 5—5 of Figure 9 looking in the direction of the arrows, showing the pointer disk and spring pulled segment which lie beneath the counter gear and segment shown in Figure 4.

In the following description, like reference numerals will be used to indicate corresponding parts throughout the various figures in the drawings but with respect to Figure 1, it should be borne in mind that the corresponding parts are only diagrammatically represented.

Figures 9, 10:
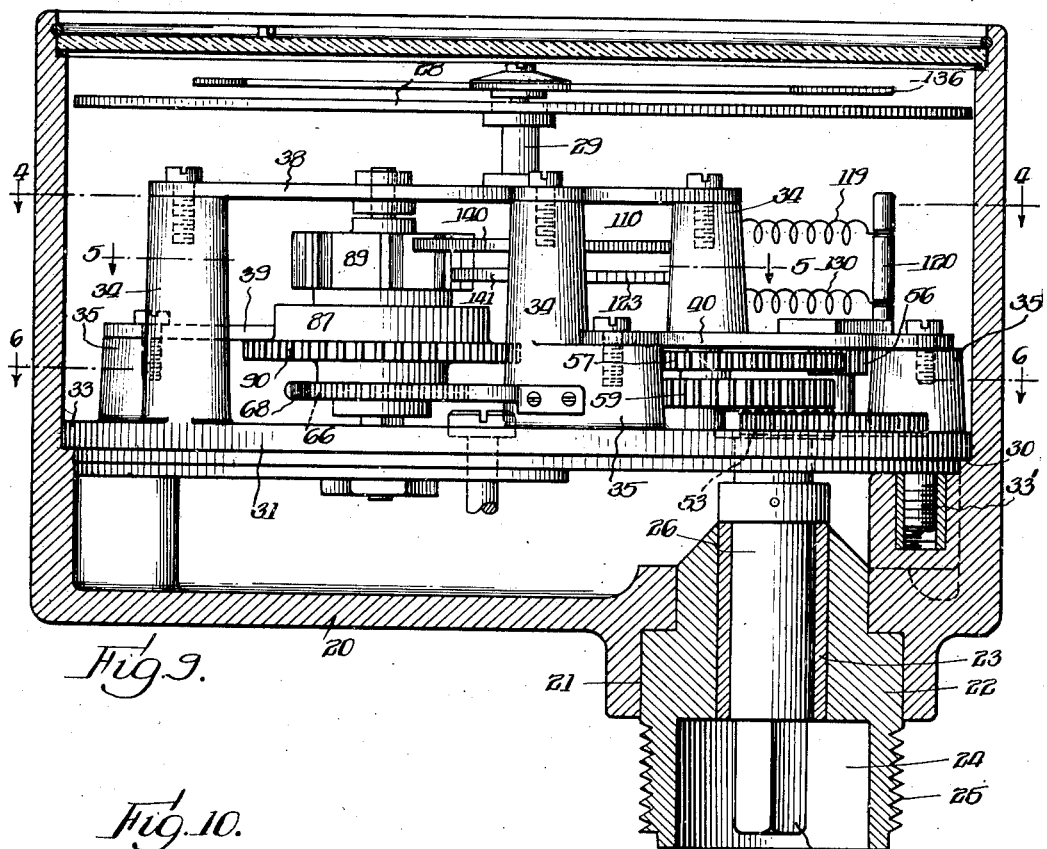
Figure 9 is a side elevational view, with the casing partially removed and partially in cross section, of the construction shown in Figure 4.
Figure 10 is an elevational view in cross section taken on the line 10—10 of Figure 4 and looking in the direction of the arrows.

By referring to the drawings, particularly Figures 9 and 10, it will be noted that the mechanism constituting the present type of tachometer, is adapted to be mounted in a casing 20, which is of cylindrical shape, having an opening 21 in one portion of its bottom wall for receiving the bushing and bearing 22 and 23 respectively. The bushing is provided with a cavity 24 in the end thereof and screw threads 25 on its outside for effecting a proper connection to any suitable casing for a driving shaft serving to connect the spindle 26 with the shaft or other rotary element, the R. P. M. of which is to be indicated.

This connection may be effected in any desired way but in the case of aeroplanes, where the tachometer is employed for indicating the R. P. M. of the engine, it is customary to use a flexible shaft, the casing of which is attached to the screw threads 25 and the inner shaft of which is fixed to the squared end 27 for rotating the spindle 26.

As shown in Figures 9 and 10, a dial 28 is provided, centered on the post 29, carried by the mechanism frame. The casing extends upwardly as shown in the drawings for enclosing the entire mechanism including the dial and indicating hand which are usually covered with a glass plate to render the dial and pointer readily visible.

The casing part 20 is preferably provided with a seat 30 for receiving the frame 31 which is more clearly shown in Figure 2.

*Frame construction*

The frame is provided with screw openings 32 by which it is bolted as shown at 33' in Figure 9, to the casing 20. The frame construction 31 shown in Figure 2, is preferably formed as an integral casting of the shape shown whereby it comprises a disk-like plate 33, having a plurality of up-standing posts 34 and 35 integrally formed therewith.

These castings may be made of bronze or any other suitable metal properly machined for providing the smoothly fitting surfaces, screw and bearing openings necessary for the complete assembly. The casting is further provided with a cylindrical housing 36, formed as an integral part thereof with the open face extending downwardly as clearly shown in Figure 3. The housing is further provided with a slot 37 in its side wall providing an opening through which the connection is made between the escapement mechanism and the fly. In addition, the frame comprises three plates, 38, 39 and 40, which are provided with suitable openings for supporting attachment on the vertical posts 34 and 35. Plate 38 is adapted for mounting on the higher posts 34 and the latter two are supported on the lower posts 35, over which they are shown positioned in Figure 2.

As shown in Figure 3, the housing 36 provides a cylindrical cavity 41 on the under side of the frame disk 33, which is adapted to receive the escapement mechanism 42. The escapement mechanism will be hereinafter more fully described but it should be understood to be a completely assembled unit entirely independent of the remaining mechanism mounted on its own base plate 43, provided with a peripheral flange 44 at its lower edge. This escapement mechanism with its mounting is adapted to be inserted into the cavity 41 provided in the main frame, with its flange 44 in fitting engagement with the annular seat 45, provided in the cavity. The escapement mechanism is capable of being rotated within the cavity to assume the proper position of adjustment in effecting its connection with the fly and when properly positioned, firmly held therein, against displacement by means of set screws 46 set in openings 47 in the under side of the frame with their edges in over-lapping binding engagement with the flange of the escapement mechanism plate.

The under side of the frame plate 33 is further provided with communicating cylindrical cavities 48 and 49 which are adapted to receive meshing gears hereinafter more fully described and also a plate seat 50 for accommodating the cover plate 51, shown in Figure 3. This cover plate is fastened in position by suitable screws so as to completely house the gears mounted in the cavities 48 and 49. From the above description of the frame, it will be noted that a very simple and yet practical construction is provided which may be formed as an integral casting insofar as the bottom plate 33 and the vertical supporting posts are concerned. This not only simplifies the production operations and attendant cost but also makes for a more rigid, reliable frame, producing a high degree of advantage in devices of this character where precision and accuracy in workmanship and operation are required.

*Driving mechanism*

Figure 1:
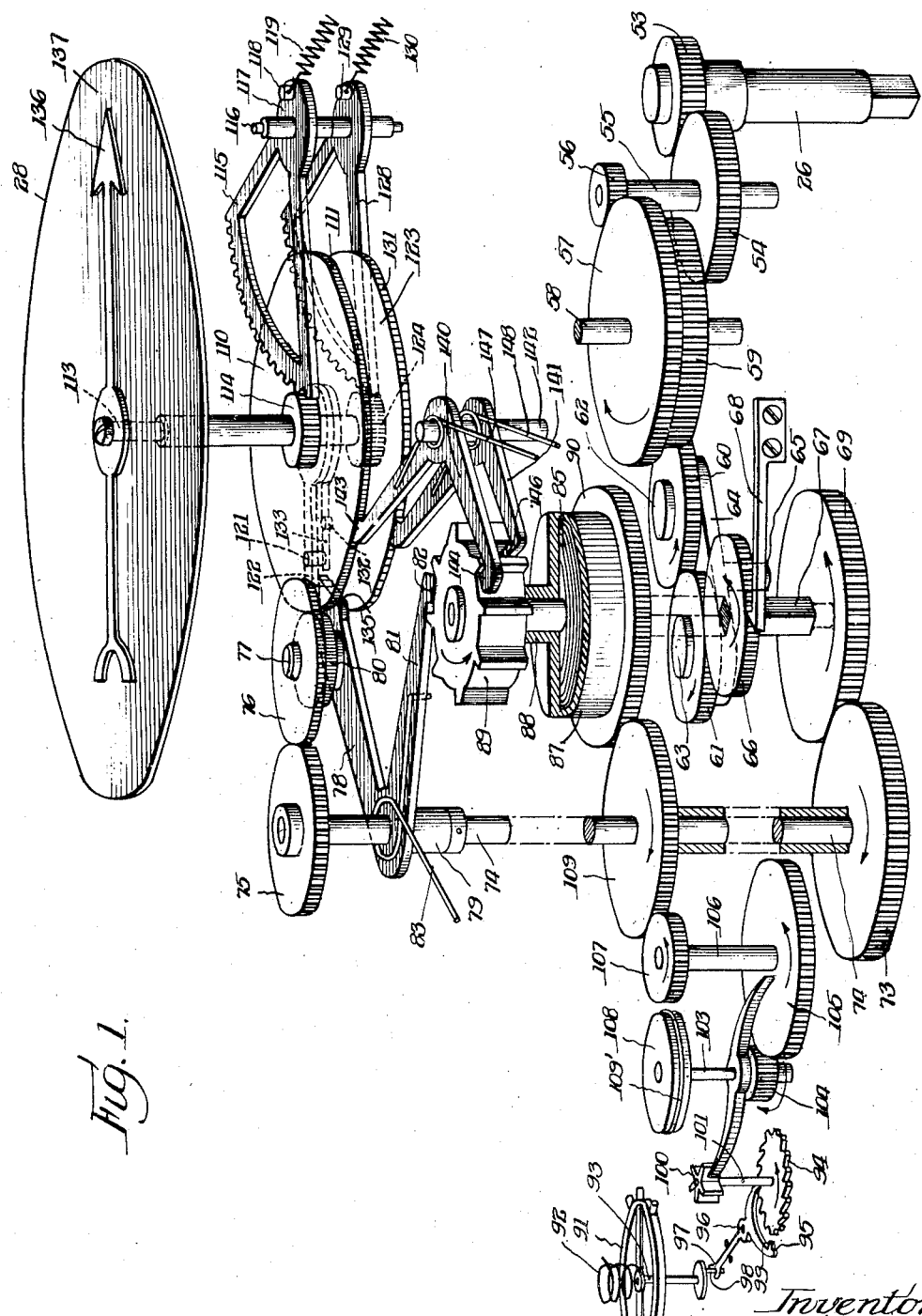
Figure 1 is a diagrammatic representation of the mechanism constituting the tachometer of this invention. In this figure, the actual construction and arrangement of parts are not accurately represented but are merely approximated in construction and arranged in a spread out manner whereby to clearly show the gear connections and the operative association of the parts.

The following description and explanation of operation is applicable to all of the figures but the manner of connecting the cooperating parts may be more clearly understood by referring to Figure 1. In Figure 1, the spindle 26 previously referred to, will be found in the lower right hand corner and it will be understood that this spindle is directly connected to the shaft or other element, the R. P. M. of which is to be indicated. The upper end of the spindle extends through a suitable opening 52, in the frame 33 and is provided with a gear 53, fixed to the upper end thereof. Gear 53 is in mesh with a gear 54 mounted on spindle 55 which has a smaller gear 56 fixed thereto. Gear 56 in turn, meshes with a gear 57 carried on spindle 58 which also has gear 59 fixed thereto. Gear 59 is in mesh with a gear 60 which constitutes a part of the reversing mechanism.

The reversing mechanism comprises gear 60, and a cooperating gear 61, which are mounted on spindles 62 and 63 respectively, which spindles are carried by a bar 64, pivotally mounted at its center on a stub shaft 65. Associated with the reversing mechanism is a gear 66, fixed to the shaft 67 which gear 66 is so disposed with respect to the reversing mechanism that either gear 60 or gear 61 is in driving contact therewith, depending upon the particular direction of rotation of gears 57 and 59 on spindle 58.

The function of the reversing mechanism is to assure the rotation of gear 66 and shaft 67 in the direction indicated thereon by the arrow irrespective of the direction of rotation of gear 59. As shown in Figure 1, the driving connection between gear 59 and gear 66 is through both of the reversing gears 60 and 61, but if gear 59 should be rotated in a direction opposite to that indicated by the arrow thereon, its contact with the gear 60, would first operate to rotate the bar 64 bodily on its pivot 65 in a manner to bring gear 60 in direct driving mesh with gear 66 with reversing gear 61 moved out of contact therewith. The result of such operation, would be the removal of one gear from the train, whereby gear 66 would continue to rotate in the same direction indicated by the arrow.

A spring pawl 68 is provided with its end in clicking engagement with the gear 66, so arranged as to prevent rotation in the wrong direction, but to permit rotation in the direction indicated by the arrow. This pawl not only prevents the improper rotation of the mechanism and the consequent liability of damage, but also holds wheel 66 when the high speed gears and shafts 53 to 59 inclusive, are reversed so as to force the bodily movement of the reversing gears for operation in the manner above described.

As more clearly shown in Figure 10, shaft 67 extends downwardly through the frame 33, and has a gear 69 mounted on the lower end thereof. The lower end of the shaft 67 is preferably provided with a reduced end 70 forming an inner race way for ball bearings 71 held by means of the bearing nut 72. It will be noted that gear 69 fits within the cylindrical cavity 49, shown in Figure 3, in the under-side of the frame 33. This gear meshes with a gear 73 fixed to the lower end of the shaft 74. Gear 73 fits in the cavity 48 as shown in Figure 3, whereas the shaft extends upwardly through the frame and provides what is herein termed the timing lever shaft.

Figure 7:
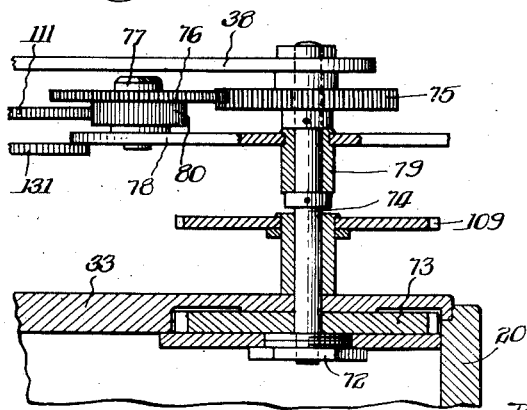
Figure 7 is a fragmentary view in vertical cross section taken on the line 7—7 of Figure 4 and looking in the direction of the arrows.

A similar bearing and bearing nut 72 is provided at the lower end of the timing lever shaft 74 as shown in Figure 7. Reference to Figures 1 and 7 will show that the timing lever shaft 74 is provided with a gear 75 fixed adjacent the upper end thereof which is in mesh with a gear 76 carried by the stub shaft 77 mounted on the end of the timing lever 78. The timing lever is pivotally mounted as at 79, for oscillation on the timing lever shaft 74, and the stub shaft 77 is so mounted as to maintain gears 75 and 76 in mesh. From this arrangement, it will readily appear that the timing lever shaft may be oscillated without in any wise disturbing the driving contact between gears 75 and 76.

A gear 80, which is herein termed the counter driving gear, is fixed to rotate with gear 76 on the stub shaft 77 which gear is provided with relatively minute teeth adapted for driving contact with similar teeth provided on the periphery of the counter gear hereinafter described.

It will be noted that the timing lever is of a bell crank formation having its opposite arm 81 extended with a cam contacting surface 82 provided at its end of the particular formation shown in Figure 4.

The timing lever is equipped with a torsional spring 83 having one end in engagement with the arm 81 and the other end anchored in contact with the frame so arranged as to exert a rotating force on the lever in that direction which tends to maintain the counter driving gear 80 in driving contact with the counter gear.

From the above description, it will be observed that the main gear train above described provides a continuous driving connection between the counter driving gear 80 and the measured shaft, and further, that the direction of rotation of the counter driving gear 80, will always be the same, irrespective of the direction of rotation of the spindle 26.

The portion of the main driving train which includes the gears and shafts 54 to 59 inclusive, is herein termed the high speed gears and these gears are mounted in the frame by means of the plate 40, shown in Figures 2 and 4, which is independently removable without disturbing the rest of the mechanism so that the high speed gears which are more subject to wear than the remaining portions of the mechanism may be quickly and safely removed and replaced without interfering with other portions of the device.

Power plant

Figure 8:
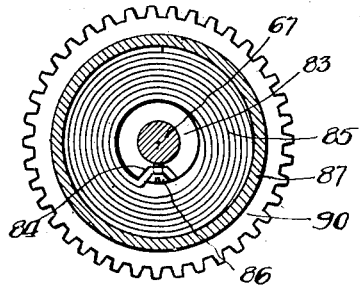
Figure 8 is a plan cross sectional view taken on the line 8—8 of Figure 10, and looking in the direction of the arrows.

Shaft 67 above referred to as a portion of the main gear train extends upwardly above the gear 66 as clearly shown in Figures 1 and 10, and has provided thereon, a hub 83, provided with a groove 84 in which is fastened the inner end of a coil spring 85. The spring may be attached by a screw 86 in the manner shown in Figure 8. The opposite end of the coil spring is free but is pressed by the action of the spring in frictional driving relationship with the inner cylindrical surface of the spring barrel 87.

The spring barrel is loosely mounted on the upper end of the shaft 67 above the hub 83 and is driven entirely by the torque imparted by the frictional drag of the outer end of the spring. The spring barrel is extended upwardly as shown in Figure 10 so as to constitute a hub 88 on which the cam 89 is fixedly mounted. By this arrangement, it will be readily understood that the cam is likewise driven by the spring, along with the spring barrel, the movement of both of which, however, is controlled by a suitable escapement mechanism hereinafter described, connected thereto by means of the gear 90 provided on the periphery of the spring barrel. The cam is of a special construction of the type shown in the figures of the drawings in order that it may possess the triple capacity of actuating the timing lever above referred to and two locking levers hereinafter more specifically described.

Although the timed operation of each of these levers is different, the desired timed operation by a single cam is made possible by selecting the particular lever centers and the lengths of the lever arms, their positions of contact with the cam face, and the extent of the cam contacting faces of each. The exact timing and the result thereof in the operation of the tachometer will be hereinafter more fully referred to.

Escapement and escapement connecting mechanism

Figure 6:
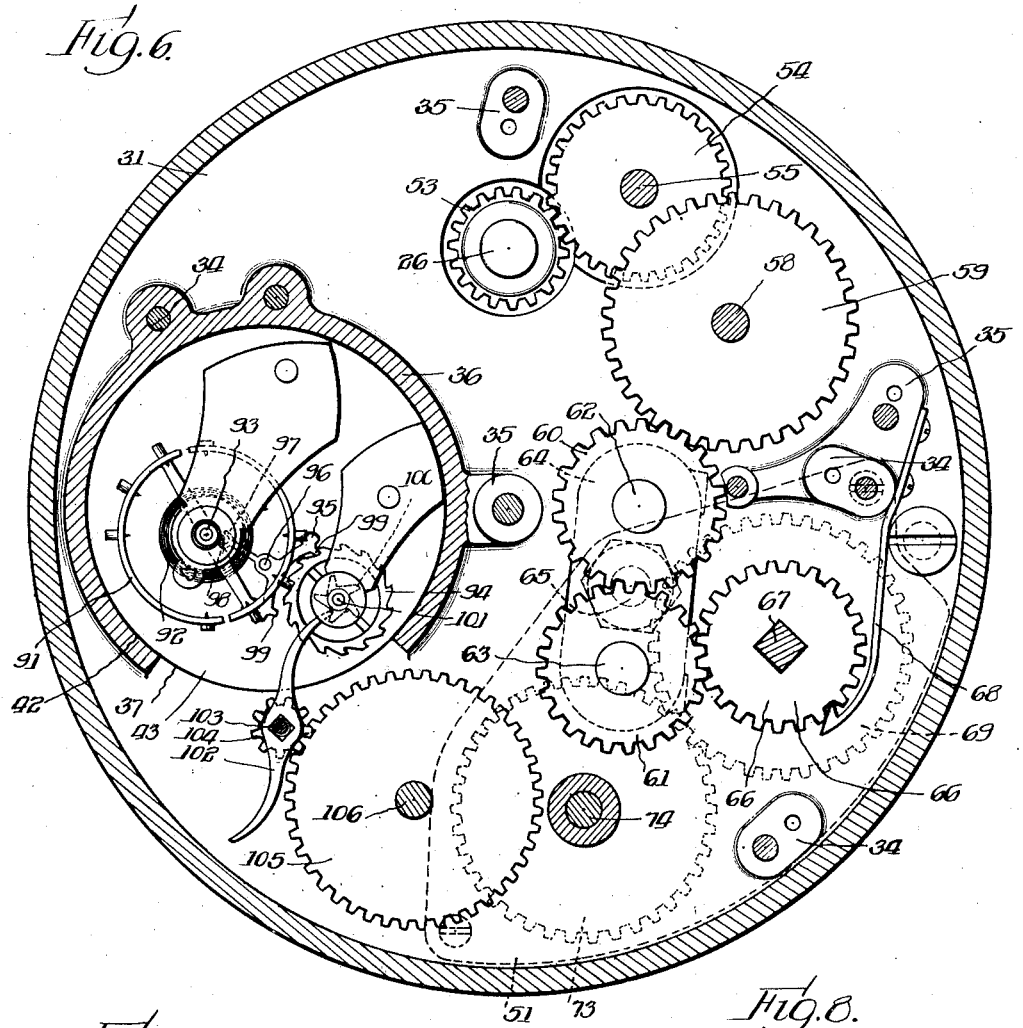
Figure 6 is a plan view showing the frame partly in cross section taken on the line 6—6 of Figure 9 and looking in the direction of the arrows.

As previously mentioned, the escapement mechanism proper is mounted on a plate 43, shown in Figure 3, and comprises as shown in Figure 6, a balance wheel 91 having a torsional spring 92, all of usual construction mounted on the shaft 93, and an escapement comprising an escapement wheel 94, and an escapement lever 95, pivoted on the shaft 96. The escapement lever has a yoke 97 at one end adapted for contact with the pin 98, carried by the balance wheel so as to impart an oscillatory movement to the escapement lever to permit the intermittent operation of the escapement wheel by the passing of the teeth beneath the lugs 99 carried on the opposite ends thereof.

In addition, a star wheel 100 is fixed to rotate with the shaft 101 on which the escapement wheel is mounted. The balance wheel, escapement, and star wheel constitute what is herein termed the escapement mechanism and is that part of the device which is mounted on the plate 43. It will be obvious that by the rotary adjustment of plate 43 above referred to, the position of the star wheel may be slightly varied so as to bring the star wheel in proper position for cooperative engagement with the fly.

The fly 102 is clearly shown in Figures 1 and 6 and comprises a pair of oppositely curved arms mounted on shaft 103 to which is also fixed a small gear 104. The fly is so constructed and positioned that the opposite points thereof are at 180° apart and adapted for successively engaging the teeth of the star wheel 100. The gear 105, is carried by the shaft 106 which has a smaller gear 107 mounted on the upper end thereof. Shaft 103 on which the fly is mounted is preferably extended upwardly for frictionally receiving a small fly wheel 108, thereon, maintained by means of the spring 109'. This fly wheel is provided merely for the purpose of stabilizing the action of the fly proper, whereby to impart to it a more positive and uniform movement in operation.

Gears 105 and 107 are herein termed intermediate gears of the escapement connecting train and these gears with their shaft 106 and the fly, with its shaft 103, are mounted by means of the frame plate 39 shown in Figure 2 so that these parts may be separately removable for replacement or adjustment without disturbing the remaining portion of the mechanism.

In practice, this has proven to constitute a very substantial advantage due to the fact that the gear 104 can be re-set in mesh with the gear 105 after movement of one, two or more teeth in either direction, for the purpose of timing the mechanism for accurate operation. The timing referred to becomes necessary in order to bring cam 89 in the desired position with respect to the three levers actuated thereby at that instant at which the fly is brought to rest by contact with the star wheel.

With the present construction, the timing can be readily effected by removing plate 39 and re-adjusting the position of the fly, all of which can be accomplished in a few minutes by a very simple and inexpensive operation.

The gear 107 above referred to, is in mesh with a gear 109 which is loosely mounted on the timing lever shaft 74, which gear in turn, meshes with the gear 90 provided on the spring barrel. The provision of the gear 109 on the timing lever shaft constitutes a further important feature in the construction here disclosed because it permits a simple and efficient means for connecting the spring barrel to the escapement mechanism without requiring alteration of the construction shown, providing a timing lever shaft 74 with its gear 75 entirely independent of the shaft 67. From the above description of the escapement mechanism and its connecting gears, it will be apparent that the spring barrel and its attached cam 89 will tend to rotate under the frictional drive of the spring but that the rotation thereof will be restrained by the escapement mechanism to permit only a rotation at a predetermined rate. It will further appear that the spring of the power plant constitutes the motive power for the escapement mechanism, as the tendency for the spring barrel to rotate is imparted through the connecting gear train, fly and star wheel to the escapement and balance wheel.

Furthermore, the fly serves to permit a free movement of the spring barrel and cam to that extent permitted by substantially 180° of rotation of the fly with the successive, quick movements interrupted by the contact between the fly and star wheel, all of which is only permitted to occur in a controlled and timed manner.

The primary function therefore of the fly is to translate the relatively continuous movement of the escapement mechanism into an intermittent start and stop movement at the cam 89. From this, it will be understood that at one point of rest of the cam, a particular lever will be down between the teeth thereof and at another point of rest, that same lever will be up on top of a tooth of the cam and, successively down and up as the operation continues.

Counter mechanism

The operation and construction of this part of the device may be more readily understood by referring to Figs. 1, 4 and 10 of the drawings. The counter mechanism comprises what is herein termed the counter gear 110 having relatively fine gear teeth 111 on the periphery thereof adapted for driving contact with the counter driving gear 80. This gear 110 is mounted on a sleeve 112 for rotation on the spindle 113 but independently thereof. A gear 114 is also mounted on the sleeve for meshing contact with the gear segment 115 which is pivotally mounted on the spindle 116, disposed in a vertical position between the frame parts as shown in Figure 10. The hub portion 117 of the gear segment is provided with a lug 118 to which is attached a tension spring 119 having its opposite end anchored to the frame as at 120, shown in Figure 4. The function of the gear segment is to cause a rotation of the counter gear in a counter clockwise direction until it is brought to rest by means of stop mechanism hereinafter more fully described. On the under side of the gear 110 a downwardly extending lug 121 is provided in a manner to contact the pivoted arm 133. This arm is mounted coaxially with the gear 110 on the hub 126 but loosely thereon so as to rotate entirely independently and only in accordance with the driving contact with the lug 121.

Mounted below the counter gear is the pointer disk 123 which is also mounted coaxially with the counter gear 110 and fixed to rotate with the spindle 113. This mounting is effected by providing the gear 124 which is pressed onto the spindle as at 125 having upwardly extending hub 126 to which the pointer disk 123 is fixedly attached. The spindle 113 has its lower end mounted in a socket 127, which forms a bearing for its lower end.

As shown in Figure 1, gear 124 which is fixed to rotate with the pointer disk is in mesh with the gear segment 128 similar to the segment 115 and likewise mounted on the spindle 116. This segment is provided with a similar lug 129 for attachment to the tension spring 130, having its other end anchored to the frame at 120. The periphery of the pointer disk is provided with a plurality of minute teeth 131 adapted for establishing the locking engagement with a locking lever hereinafter more fully described.

As shown in Figure 10, a lug 132 is fixed to the pointer disk to extend upwardly toward the counter gear but of less height than the lug 121 and mounted at a less radial distance from the axis whereby the two lugs travel in different circumferential paths. In addition to the pivoted arm 133 above referred to, a second arm 122 is provided loosely pivoted coaxially with the first arm, but as shown in Figures 1 and 10 it is mounted above the arm 133 and is longer in the radial direction. Furthermore, the arm 122 is provided with a depending end 134 so that under certain conditions it will be brought in contact with the end 135 of the timing lever 78 which forms a stop for the counter mechanism. Pivoted arm 133 can be freely rotated beneath the arm 122 without contacting therewith, but as the arm 133 is of sufficient length to engage the lug 121, when the arm 133 is positioned between lugs 121 and 132 as shown in Figure 5 rotary movement is imparted to the pointer disk in a clockwise direction by movement of the lug 121. The relationship of the parts as shown in Figure 5 and designated "A position" represents the stop or zero position established under the action of the segments 115 and 128 by movement in a counter-clockwise direction until such movement is interrupted by means of the stop 135. The pivoted arm 122 is brought to rest by contact with the stop arm 135 which in turn forms a stop for the lug 121. Similarly the arm 133 and the lug 132 are brought to rest after abutting the lug 121.

By referring to Figures 1, 9 and 10 it will be noted that the upper end of the spindle 113 is provided with an indicating hand or pointer 136 fixed thereto and disposed in an indicating relationship above the dial face 137 which is properly graduated in a manner to provide an accurate reading indicative of the speed of rotation of the shaft being measured. This dial face is preferably supported at spaced points by means of the upstanding columns such as shown at 138 and screws 139. Referring again to Figure 5 it should be understood that when the parts are in the position shown the pointer or indicating hand is at zero position on the dial.

Thereafter, by the action of the cam 89 the timing lever is moved to bring the counter driving gear 80 in driving contact with the periphery 111 of the counter gear 110 whereby the lug 121 is rotated in a clockwise direction for a period of one second. As the rotation of the counter gear during the period of one second is derived through the main gear train from the measured shaft and the speed of rotation is directly proportional to the speed of rotation of the measured shaft during the period of one second, and furthermore due to the direct contact between the lug 121 carried by the counter gear, pivoted arm 133 and lug 132 carried by the pointer disk, the pointer disk and pointer are likewise advanced a corresponding amount. During this portion of the operation it may be considered that the lugs 121 and 132 and the interposed arm 133 are effective to cause the counter gear and pointer disk to rotate as a unit. Such rotation of course is in opposition to the action of the spring pulled segments 115 and 128 and therefore, energy is stored in the tension springs, which later, acts to restore the counter gear and the pointer disk to their zero positions.

The action of the lugs 121 and 132 and arm 133 continues as above described until these parts have traveled approximately one revolution or have reached the position shown in the dotted lines in Figure 5, marked "B position." Upon arriving at "B position" if the speed of the measured shaft is so great as to cause more than one revolution of the counter gear during the period of one second, the rotation continues in a clockwise direction as before with the exception that the pivoted arm 122 is now picked up by lug 121 and pushed ahead thereof. Movement in the clockwise direction with the parts disposed in "B positions" may then be continued throughout the major portion of the second revolution or until the arm 122 comes in contact with the opposite side of the abutment stop 135. If the parts reach this maximum position the mechanism becomes inoperative.

This of course will vary in different instruments according to the range of speed to be indicated and by including in the mechanism, the lugs 121 and 132 and pivoted arms 122 and 133 substantially two rotations of the counter mechanism are provided as an accurate indicating range with a corresponding elimination of additional reducing gears which would otherwise be necessary for measuring rotations of the same speed.

Reference will now be made to the operation of the locking lever 140, which operates to hold the counter gear under certain predetermined conditions and the locking lever 141 which serves to hold the pointer disk in proper indicating position. By referring to Figures 1 and 4 it will be noted that the locking lever 140 is loosely pivoted on a shaft 142 suitably mounted in the frame and is provided with one arm having minute teeth 143 on the end thereof for locking engagement with the teeth 111 on the periphery of the counter gear and with its other arm provided with a head 144 adapted for engagement with the face of the cam 89. Likewise the locking lever 141 is provided with minute teeth 145 for engagement with the teeth on the periphery of the pointer disk with its other arm provided with a cam contacting head 146 in operative association with the face of the cam 89. Locking lever 141 is likewise loosely pivoted on the shaft 142 coaxially with the locking lever 140. These levers are provided with torsional springs 147 and 148 respectively, which have one end in engagement with the levers and their other ends anchored to the frame in a manner to urge the levers in a clockwise direction as shown in drawings whereby the heads 144 and 146 will be kept in contact with the face of the cam 89 and the toothed ends 143 and 145 will be urged in locking engagement with the counter gear and pointer disk respectively. It will therefore appear that the levers will be effective to hold the counter gear and the pointer disk against return movement under the action of the spring pulled segments 115 and 128 as long as the heads 144 and 146 of said levers are permitted to engage a depression between the teeth of the cam 89, and that conversely when the heads 144 and 146 are caused to ride up and be held on top of a tooth of the cam 89 the locking levers will be out of engagement with the counter gear and the pointer disk. It will therefore be understood that the timing of this mechanism is so adjusted that all rotation both in the advancing and in the returning directions is effected during those periods when the locking levers are out of locking engagement, except that during the period when the pointer disk is being advanced its locking lever 141 is in ratcheting engagement with it.

With this understanding, it will appear that after the lugs 121 and 132 and the pivoted arms 122 and 133 have assumed the "B positions" and perhaps have rotated to some degree through the second revolution, at the expiration of one second of rotation locking lever 140 is moved into locking engagement with the counter gear and pointer disk at the same instant that the timing lever is moved in counter-clockwise direction to a sufficient degree to disengage the driving contact between the counter driving gear 80 and the counter gear. This action operates to bring the advancing movement of the counter mechanism to rest, with the counter gear and the pointer disk held in their advanced positions.

Upon the next movement of the cam which occurs after the passing of the fraction of a second, the locking lever 141 is unlocked, whereby the pointer disk is free to move in a return direction, provided however, it is not held by direct contact against the arm 133 and lug 121. If arm 133 and lug 121 are holding the pointer disk even though the locking lever 141 is released no return movement can be effected as long as the counter gear is held by its locking lever. This action is important only when the speed of the measured shaft is decreasing, because in such instances, the successive points of advancement of the counter gear for successive seconds of operation are less, and therefore provision must be made to permit the pointer disk and indicating hand to return that degree of movement indicative of the decrease of speed, so that when the locking lever 141 is moved out of locking engagement a return movement of the pointer disk is permitted until the lug 132 and the rotating arm 133 are moved into stopping engagement with the lug 121, it being understood that the position of lug 121 is that effected by the last preceding second of operation.

Assuming now that the pointer disk has assumed its new position as determined by the last point of advancement of the counter gear, the locking lever 141 again assumes a locking position so that the pointer disk is held in this position. Immediately thereafter, locking lever 140 is moved out of locking engagement whereby this gear 110 is permitted to resume a zero position under the action of the spring pulled segment 115. The return movement continues until the counter gear has been returned to zero position indicated as "A position" in Figure 5. There it will be noticed the lug 121 and the arm 122 have been moved until the arm 122 abuts the stop end 135 of the timing lever. Although the timing lever is moved slightly under the action of the cam to connect and disconnect the drive between the counter driving gear and the counter gear this movement is not sufficient to influence the stopping effect of the abutment 135, which is always in stopping relationship to the arm 122.

After the counter gear has resumed its zero position the inactive time period of one second expires and the counter driving gear is once more thrown in driving engagement with the counter gear. As a result the counter gear is advanced to a new position indicative of the average speed of rotation of the measured shaft for a new period of one second of operation. If it should happen that the speed is increasing the counter gear will advance to a point where it picks up the pointer disk and advances the pointer disk to a new position indicative of the higher speed which can be readily done notwithstanding the engagement of the locking lever 141 due to the angular disposition of the locking teeth which permit the pointer disk to slip in the advancing direction, though securely held against return movement.

On the other hand when the speed of the shaft being measured is decreasing, it is clear as above pointed out the new position of the counter gear is less advanced than the position of the pointer disk whereupon the locking lever 140 will be thrown in to hold the counter gear, and thereafter the locking lever 141 will be thrown out to permit the pointer disk to return to the position where it will be stopped by arm 133 and lug 121, indicative of the average speed for the last second of operation.

Operation

With the above understanding of the mechanism constituting the device of this invention, a brief statement of operation will now be given. Referring particularly to Figure 1, the shaft to be measured is fixed to rotate the spindle 26. This spindle through the medium of the high speed gears and shafts indicated by numerals 53 to 59 inclusive imparts a rotary movement to gear 66 and shaft 67 in a counter-clockwise direction through the instrumentality of the reversing mechanism comprising the pivoted bar 64, gears 60 and 61. The above described reversing mechanism operates to impart rotation to the shaft 67 in a counter-clockwise direction for either direction of rotation of the high speed gears. The locking spring 68 which engages the periphery of gear 66 holds this gear against rotation in a clockwise direction and serves to force the proper movement of the reversing gears. Shaft 67 through the instrumentality of gears 69 and 73 rotates the timing lever shaft 74 and the gear 75, which in turn drives the gear 76 and the counter driving gear 80.

Shaft 67 further imparts a winding movement to the spring 85 which has its outer end in frictional driving engagement with the inside surface of the spring barrel 87. The cam 89 is fixed to rotate with the spring barrel 87 and the movement of both of these elements is controlled by the escapement mechanism and fly 102. The spring 85 supplies the motive power for the escapement mechanism whereby through the timed operation of the balance wheel and escapement the spring barrel and cam are permitted to rotate at a definite timed rate of speed but with intermittent stop and start motion as effected by the fly 102 which escapes with free rotation for approximately 180° when its arms move free of the star wheel 100. As a result it will appear that the counter driving gear is continuously rotated at a speed directly proportional to the measured shaft and that the cam 89 is rotated in a counter-clockwise direction at a definitely timed rate, whereby the cam will exert the desired timed movement on the timing lever 78 and locking levers 140 and 141 respectively. The action of the timed movement of these levers is as follows:

Timing lever 78 is caused to move in a clockwise direction to bring the counter driving gear 80 in driving contact with the driving gear 110, it maintaining this contact for a period of one second. As a result through the instrumentality of lug 121 carried by counter gear, lever 133, and lug 132, the pointer disk 123 is caused to advance an amount proportional to the speed of rotation of the measured shaft for a period of one second and to carry with it the indicating hand. This mechanism as above described, will permit approximately two revolutions of the pointer disk and indicating hand whereby for relatively high speeds the dial can be graduated in a manner to indicate higher speeds for a second revolution of the hand. After one second of operation, the locking lever 140 is thrown in engagement and simultaneously therewith the timing lever is brought out of engagement with the counter gear and thereafter held out of engagement by cam 89 for the following period of one second. During this second the first action is the release of pointer disk locking lever 141 so that the pointer disk 123 is free to return until it contacts lever 133 held by lug 121 carried by the counter gear if such is possible by a reduction in speed. After an elapse of approximately half a second or slightly less, locking lever 141 is again thrown in locking contact to hold the pointer disk and the indicating hand at the last indicating position, while immediately thereafter locking lever 140 is thrown out of locking engagement by the action of the cam 89 to permit the counter gear to be restored to zero stop position under the action of the spring pulled segment 115. This operation occupies the intervening period of one second, whereupon the counter driving gear is again thrown into driving engagement with the counter gear to cause a duplicate operation starting from zero position. By the continued repetition of the operation the indicating hand is caused to assume a series of positions which are indicative of the average speed for each alternate second of operation.

From the above description it will be obvious that a device is provided which embodies the numerous advantages pointed out therefor, one of the most important of which is the utilization of a single cam for operating the timing lever 78 and the locking levers 140 and 141. It will be understood that the variable action of these levers by the single cam is made possible by selecting the centers of the levers, the lengths of the contacting arms and the extent of the cam contacting faces on the levers with each tooth on the cam small enough to effect the shortest necessary operating period, which in this case is the unlocked position of the locking lever 141.

A further advantage of marked importance is the mounting of the timing lever coaxially with the gear 75 so that the movement thereof by the action of the cam causes the counter driving gear to travel in a circumferential path about the axis of the gear 75. This results in a more perfect operation in that an absolutely positive gear contact is maintained between the counter driving gear 80 and the remaining portion of the main gear train.

Another advantage is the utilization of gear 109 mounted loosely but coaxially with the timing lever shaft 74 for establishing the gear connection between the power plant and the clock mechanism, and also the mounting of gears 69 and 73 on the lower side of the frame plate.

Other advantages reside in the frame construction with the main portion thereof formed as a frame plate having integrally formed supporting posts with separately removable frame plates for high speed gears and the fly whereby these parts may be removed and replaced and the fly may be adjusted for timing the mechanism without in any way disturbing or interfering with the rest of the assembly.

A further advantage resides in the spring pulled segments in combination with the zero stop mechanism, which makes for smoother and more perfect action than corresponding devices used for the same purpose.

We claim:

1. In a chronometric tachometer the combination of a frame for mounting parts thereof including a fly and an independently formed escapement mechanism mounted on an independent plate, said escapement mechanism including a star wheel adapted for operative contact with said fly, said frame having a housing providing a cylindrical cavity for receiving said mechanism and plate, said mechanism and plate being capable of rotary adjusting movement within said cavity whereby to permit adjustment of the contact between said fly and star wheel and means for securing said plate in said cavity against accidental movement or displacement.

2. In a chronometric tachometer the combination of a frame for mounting parts thereof including a fly and an escapement mechanism including a star wheel independently mounted on a separate plate, said plate being mounted in said frame with said star wheel in operative association with said fly but capable of movement with respect thereto for adjusting the operative contact between said escapement mechanism and said fly.

3. In a chronometric tachometer the combination of an integrally formed frame for mounting parts of said tachometer having a housing providing a cylindrical cavity, an escapement mechanism including a star wheel independently mounted on a separate round plate adapted to be adjustably secured in said cavity, and a fly mounted on said frame for operative engagement with said star wheel, said housing having an opening in one wall thereof for accommodating the arms of said fly and said plate being capable of rotation in said cavity to adjust the engagement between the star wheel and fly, and means for securing said plate against accidental movement or displacement.

4. In a chronometric tachometer of the character described, a frame for mounting the parts thereof, comprising a pair of spaced plates and intermediate supporting posts, a main gear train, a spring barrel loosely mounted on one shaft thereof, and a timing lever shaft having a timing lever loosely mounted thereon all mounted in said frame between said pair of spaced plates, said two shafts extending through one of said plates and having meshing gears on the ends thereof mounted on the outside of said plate.

5. In a chronometric tachometer of the character described, a frame for mounting the parts thereof comprising spaced plates and supporting posts, one of said plates having gear receiving depressions on its outside face, a plurality of shafts mounted between said plates having connected gears thereon, constituting a gear train, and a timing lever shaft mounted between said plates, one of said plurality of shafts and said timing lever shaft extending through said plate formed integrally with said posts and having meshing gears on the ends thereof in said depressions.

6. A chronometric tachometer of the character described comprising a frame for mounting the parts thereof including an escapement mechanism, a fly, and a gear train, said frame having a separate and independent frame plate for mounting said fly whereby said fly may be removed or adjusted relative to said gear train without disturbing the escapement or remaining mechanism.

7. A chronometric tachometer of the character described comprising a frame for mounting the parts thereof including an escapement mechanism and a gear train, said frame comprising a base plate, supporting posts and removable plates supported on said posts, a fly for connecting said escapement mechanism and gear frame mounted in said frame between said base plate and one of said separate and independently removable plates whereby said fly is capable of being removed for replacement or adjusted relative to said gear train without disturbing the escapement or remaining mechanism.

8. A tachometer of the character described comprising a main gear train, a timing lever shaft having a fixed axis driven thereby, a spring barrel and cam loosely mounted for rotation on a shaft of said main gear train and an escapement mechanism for controlling the movement of said spring barrel and cam connected by means including a gear loosely mounted on said timing lever shaft.

9. In a tachometer of the character described, a positively driven shaft and a timing lever shaft having a fixed axis, each provided with meshing gears, a spring barrel and a cam loosely mounted on said first shaft and an escapement mechanism for controlling the movement of said spring barrel and cam, connected to said spring barrel by means including a gear loosely mounted on said timing lever shaft.

10. In a tachometer of the character described, a counter gear and an oscillatable timing lever, said lever carrying a counter driving gear adapted to be moved into and out of driving engagement with said counter gear by movement of said lever, and a locking lever for said counter gear and a cam having a single cam surface for actuating said timing and locking levers.

11. In a tachometer of the character described, a counter gear, a timing lever carrying a driven gear for intermittently driving said counter gear, and a locking lever for holding said counter gear against return movement, and a rotary cam having a single cam surface for actuating said timing and locking levers, said cam and locking levers being so constructed and arranged as to produce a desired predetermined timed operation.

12. In a chronometric tachometer, a counter gear, a pointer disk, and means for driving said pointer disk from said counter gear in one direction of rotation, and a counter driving gear carried for bodily movement on an oscillatable timing lever, a locking lever for said counter gear and a locking lever for said pointer disk, said two locking levers and said timing lever being operated in a predetermined timed relationship by a cam having a single cam surface.

13. In a chronometric tachometer, a counter gear and a pointer disk, and means for driving said pointer disk from said counter gear in one direction of rotation and a counter driving gear carried for bodily movement on an oscillatable timing lever, a locking lever for said pointer disk, said locking lever and said timing lever being operated in a predetermined timed relationship by a rotary cam having a single cam surface.

14. In a chronometric tachometer of the character described, the combination of a rotary cam having a single cam surface, a counter-gear, a pointer disk, a timing lever and a pair of locking levers, one each for said counter gear and pointer disk respectively, said levers being actuated in a predetermined timed relationship by said cam.

15. In a chronometric tachometer of the character described, the combination of a rotary cam having a single cam surface controlled by escapement mechanism, a counter gear, a pointer disk, a bell crank timing lever carrying gear means on one arm thereof for driving said counter-gear; a pair of bell crank locking levers each having one of its arms constructed for locking engagement one with said counter gear and the other with said pointer disk the other arms of each of said three levers being disposed in operative association with said cam, said cam and levers being so constructed and arranged relative to each other as to provide a different operating cycle for each lever in a predetermined timed relationship.

16. In a chronometric tachometer, the combination of a cam having a single cam surface, a counter-gear, a pointer disk, a timing lever and a pair of locking levers for said counter gear and pointer disk respectively, said timing lever and locking levers being all constructed and disposed for operation by said single cam surface.

17. In a chronometric tachometer, the combination of a cam having a single cam surface, a counter-gear, a pointer disk, a timing lever and a pair of locking levers for said counter gear and pointer disk respectively, said timing lever and locking levers being all constructed and disposed for operation by said single cam surface, said locking levers being mounted for oscillation on the same axis.

18. In a chronometric tachometer, the combination of a cam having a single cam surface, a counter-gear, a pointer disk, a timing lever and a pair of locking levers for said counter gear and pointer disk respectively, said timing lever and locking levers being all constructed and disposed for operation by said single cam surface, said locking levers being mounted for oscillation on the same axis with their cam contacting arms and cam contacting faces of different lengths.

19. In a chronometric tachometer, a rotary cam having a plurality of teeth thereon providing a single cam surface, a timing lever and two separately operable locking levers having one arm each in engagement with the face of said cam, said cam and levers being constructed and arranged to effect a predetermined but different timed movement for each of said levers, the teeth of said cam being sufficiently small with respect to the contacting face of one of said levers to produce the quickest lever action desired and to provide with cam contacting faces of increased length on said other levers slower lever actions.

20. A chronometric tachometer of the character described comprising a frame for mounting the parts thereof, including an escapement mechanism, a fly, a gear train, and a cam, said frame having a separate and independent frame plate for mounting said fly and the adjacent gear of said gear train whereby said fly and gear may be removed and adjusted for timing said cam without disturbing or dismounting the other mechanism.

VICTOR E. SHOWALTER.
CLARENCE H. GUPTAIL.

CERTIFICATE OF CORRECTION.

Patent No. 1,978,605.  October 30, 1934.

VICTOR E. SHOWALTER, ET AL.

It is hereby certified that error appears in the printed specification of the above numbered patent requiring correction as follows: Page 9, line 63, claim 7, for "frame" read train; and that the said Letters Patent should be read with this correction therein that the same may conform to the record of the case in the Patent Office.

Signed and sealed this 8th day of January, A. D. 1935.

Leslie Frazer (Seal)

Acting Commissioner of Patents.